US006535204B2

(12) United States Patent
Sun

(10) Patent No.: US 6,535,204 B2
(45) Date of Patent: Mar. 18, 2003

(54) MANUSCRIPT INPUT DATA PROCESSING DEVICE

(75) Inventor: Ching-Yeh Sun, Taipei (TW)

(73) Assignee: Palmwalker Ltd., Taipei (TW)

( * ) Notice: Subject to any disclaimer, the term of this patent is extended or adjusted under 35 U.S.C. 154(b) by 131 days.

(21) Appl. No.: 09/842,722

(22) Filed: Apr. 27, 2001

(65) Prior Publication Data

US 2002/0158850 A1 Oct. 31, 2002

(51) Int. Cl.⁷ .............................................. G09G 5/00
(52) U.S. Cl. ...................................... 345/173; 345/171
(58) Field of Search ................................ 345/173, 171, 345/156, 157, 162, 179, 470, 471; 178/18.1; 341/22, 23; 704/3, 7, 8; 434/157

(56) References Cited

U.S. PATENT DOCUMENTS

| | | | | |
|---|---|---|---|---|
| 4,531,119 A | * | 7/1985 | Nakayama et al. | 345/171 |
| 4,636,977 A | * | 1/1987 | Ikemoto et al. | 704/3 |
| 5,043,712 A | * | 8/1991 | Kihara et al. | 345/471 |
| 5,319,386 A | * | 6/1994 | Gunn et al. | 345/173 |
| 5,854,997 A | * | 12/1998 | Sukeda et al. | 704/3 |

* cited by examiner

Primary Examiner—Xiao Wu
(74) Attorney, Agent, or Firm—Bacon & Thomas, PLLC

(57) ABSTRACT

Manuscript input data processing device including a controlling terminal and a controlled terminal. The controlling terminal includes a display section, an input section and a pen unit. The controlled terminal includes a word selection unit, a memory, a display/control unit and a word operation unit. The controlling terminal has functions of control and display, while the controlled terminal has functions of memory, selection and display. The pen unit is used to touch and sequentially write on the input section the word stroke sequence and corresponding position shown in the word display unit by way of special notation. The display/control unit will record the word track written by the pen unit into the memory. At the same time, the data are output to the corresponding position in the word display unit. After the user completes the correct writing of the word stroke sequence, another word can be selected and automatically displayed. Alternatively, the same word can be used for further practice. Accordingly, the user himself/herself can learn writing.

7 Claims, 4 Drawing Sheets

MANUSCRIPT INPUT DATA PROCESSING DEVICE

BACKGROUND OF THE INVENTION

The present invention is related to a manuscript input data processing device by which a user can correctly practice and learn the writing of words and at the same time understand the profile, pronunciation and meaning of the words.

There are various types of writing assistant implements such as early writing inductive transcription printed with dotted characters. A learner can write along the track of the dotted character to learn writing. However, after written, such inductive transcription cannot be repeatedly used so that the help in writing is limited.

In addition, a word tracer has been developed for learning writing, that is, a thin plastic sheet is perforated to form a track of a word. When used, the word tracer is placed on a paper and a learner can use a pen to write the word along the perforation in sequence of the strokes. However, the perforations in form of a word are generally very narrow so that the learner can hardly easily write the word and learn writing. Especially, when learning writing of Chinese characters which have a lot of complicated strokes, it will be difficult or even impossible to manufacture such word tracer.

Furthermore, all the conventional writing assistant implements only enable a user to learn the strokes and profiles of the words, while the user cannot learn the reading, meaning or application of the words from the writing assistant implements.

Therefore, the conventional writing assistant implements are imperfect and can hardly achieve complex functions. Therefore, it is necessary to provide a writing assistant implement which enables a user to at the same time correctly learn writing of the words and know the reading, meaning and application of the words.

SUMMARY OF THE INVENTION

It is therefore a primary object of the present invention to provide a manuscript input data processing device by which a user can freely select various kinds of words and correctly practice and learn the writing of the words. At the same time, the user can understand the profile, pronunciation and meaning of the words and learn example sentences of the words.

According to the above object, the manuscript input data processing device of the present invention includes a controlling terminal and a controlled terminal. The controlling terminal has functions of control and display, while the controlled terminal has functions of memory, selection and display. The controlling terminal includes a display section, an input section and a pen unit.

The display section and the input section such function that when the pen unit touches the input section, the corresponding position of the cursor is displayed and the coordinate data are input to overlap the display section. The pen unit touches the input section to indicate the coordinate position of the pen unit. The controlled terminal includes a word selection unit, a memory, a display/control unit and a word operation unit. The word selection unit enables a user to search the data in the memory according to the word option of his/her own learning progress. Via the display/control unit, the data are shown by the display section of the controlling terminal. The memory serves to record the track of the pen unit and various data previously recorded in the word selection unit. When the pen unit touches the input section, the display/control unit executes the point selected option at the corresponding position of the display section or records the corresponding position of the word display unit of the moving track of the pen unit in the memory and displays the track in the word display unit. The word operation unit includes a word option control unit, a word display unit and a word message display unit. The word option control unit enables a user to decide whether a function should be closed according to different learning needs. The word display unit provides the words selected in the word selection unit and shows the word stroke sequence by way of the option and specific notation pattern decided in the word option control unit. It also enables a user to with the pen unit write the corresponding position of the word stroke with specific notation in the input section and show the writing track. The word message display unit enables a user to display relevant data of the above selected word.

The present invention can be best understood through the following description and accompanying drawings wherein:

DETAILED DESCRIPTION OF THE PREFERRED EMBODIMENTS

Figure 1:
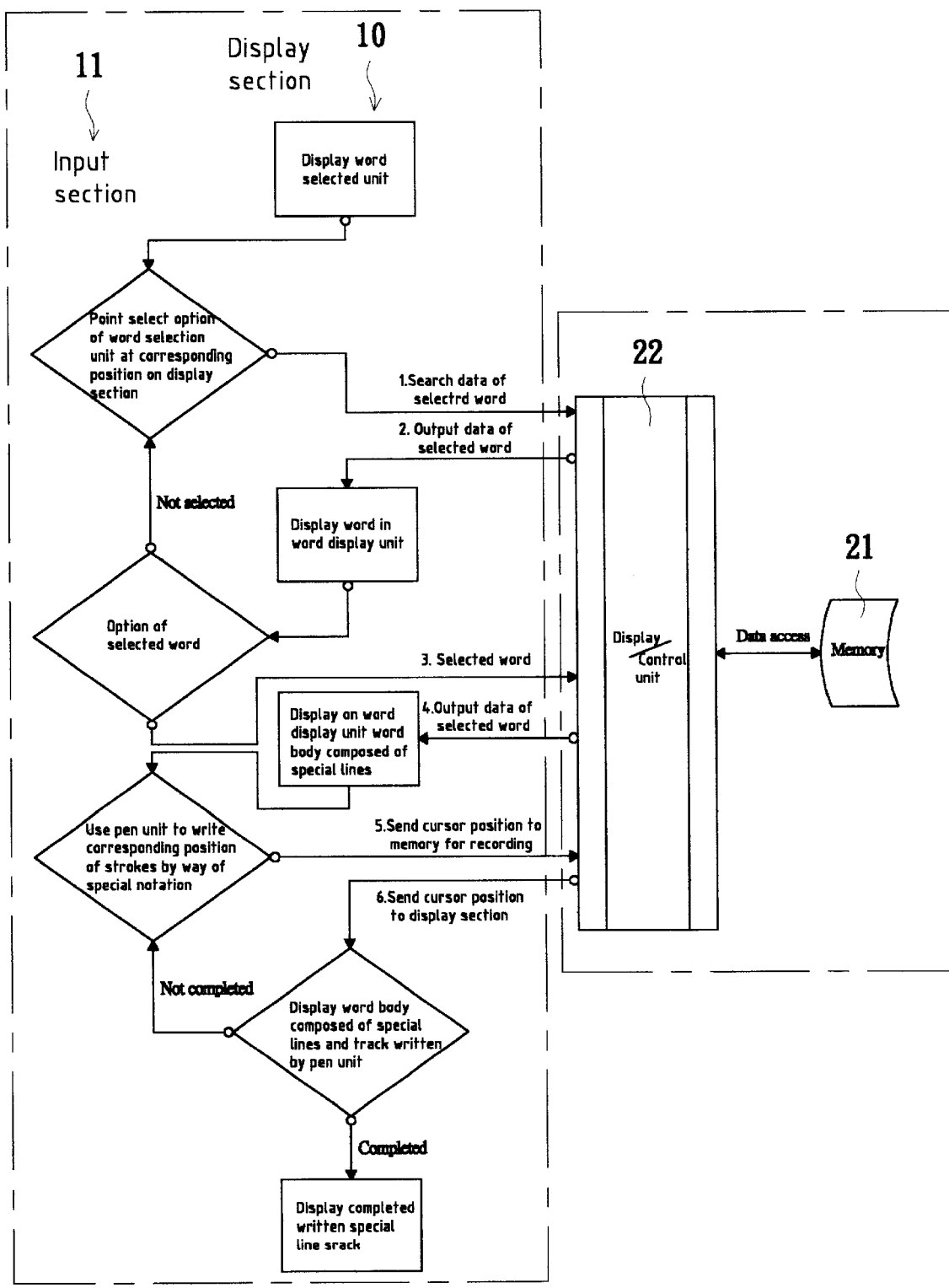
FIG. 1 is a flow chart of the present invention.

Please refer to FIG. 1 which shows the flow chart of the manuscript input data processing device of the present invention. The manuscript input data processing device includes a controlling terminal and a controlled terminal. The controlling terminal has functions of control and display, while the controlled terminal has functions of memory, selection and display.

The controlling terminal is like an external controlling unit of a computer applicable to fixed desktop computer or some of the existent notebook-type computer, personal digital assistant (PDA) and portable or mobile data processing equipment. The controlling terminal provides functions of input, display and memory and includes a display section 10, an input section 11 and a pen unit 12.

The display section 10 and the input section 11 are similar to a touch-controlled panel cooperating with a display. When the pen unit 12 touches the input section 11, the corresponding position of the cursor is displayed and the coordinate data are input to overlap the display section 10.

The pen unit 12 has an end section with point selection function.

When the pen unit 12 touches the input section 11, the coordinate position of the pen unit 12 is indicated.

The controlled terminal pertains to internal operation units of the fixed desktop computer or the existent notebook-type computer, personal digital assistant (PDA) and portable or mobile data processing equipment. The controlled terminal includes a word selection unit 20, a memory 21, a display/control unit 22 and a word operation unit 23. The word operation unit 23 further includes a word option control unit 231, a word display unit 232 and a word message display unit 233.

The word selection unit 20 enables a user to search the data in the memory 21 according to the word option of his/her own learning progress. Via the display/control unit 22, the data are shown by the display section 10 of the controlling terminal. The word option of the word selection unit 20 further includes word subject, hardness grade or even classification manners (such as stroke sequence, character head, etc.) for facilitating learning and consulting words. The word contents of the word selection unit 20 are not limited to Chinese characters and can include English, Japanese characters or words of other languages previously stored in the memory 21. Therefore, a user can have versatile learning options.

The memory 21 serves to record the track of the pen unit and various data previously recorded in the word selection unit 20. In this embodiment, the memory 21 is a common memory module including fixed-type memory element able to or unable to renew data or mobile memory element with replaceable and changeable functions.

When the pen unit 12 touches the input section 11, the display/control unit 22 executes the point selected option at the corresponding position of the display section 10 or records the corresponding position of the word display unit 232 of the moving track of the pen unit in the memory 21 and displays the track in the word display unit 232.

The word operation unit 23 includes a word option control unit 231, a word display unit 232 and a word message display unit 233. The word option control unit 231 enables a user to decide whether a function should be closed according to different learning needs, including the functions of showing stroke sequence and setting learning mode, etc. and also including notation patterns composed of various kinds of colors, lines or numerals. Accordingly, a user can easily identify and read and realize the data options. The word display unit 232 provides the words selected in the word selection unit 20 and shows the word stroke sequence by way of the option and specific notation pattern decided in the word option control unit 2311. It also enables a user to with the pen unit write the corresponding position of the word stroke with specific notation in the input section and show the writing track. The word message display unit 233 enables a user to display relevant data other than the word body message of the above selected word, including meaning, spelling, example sentence and previously recorded pronunciation of the word. The spelling manner can be Roman spelling, Chinese spelling or other spellings.

Figure 2:
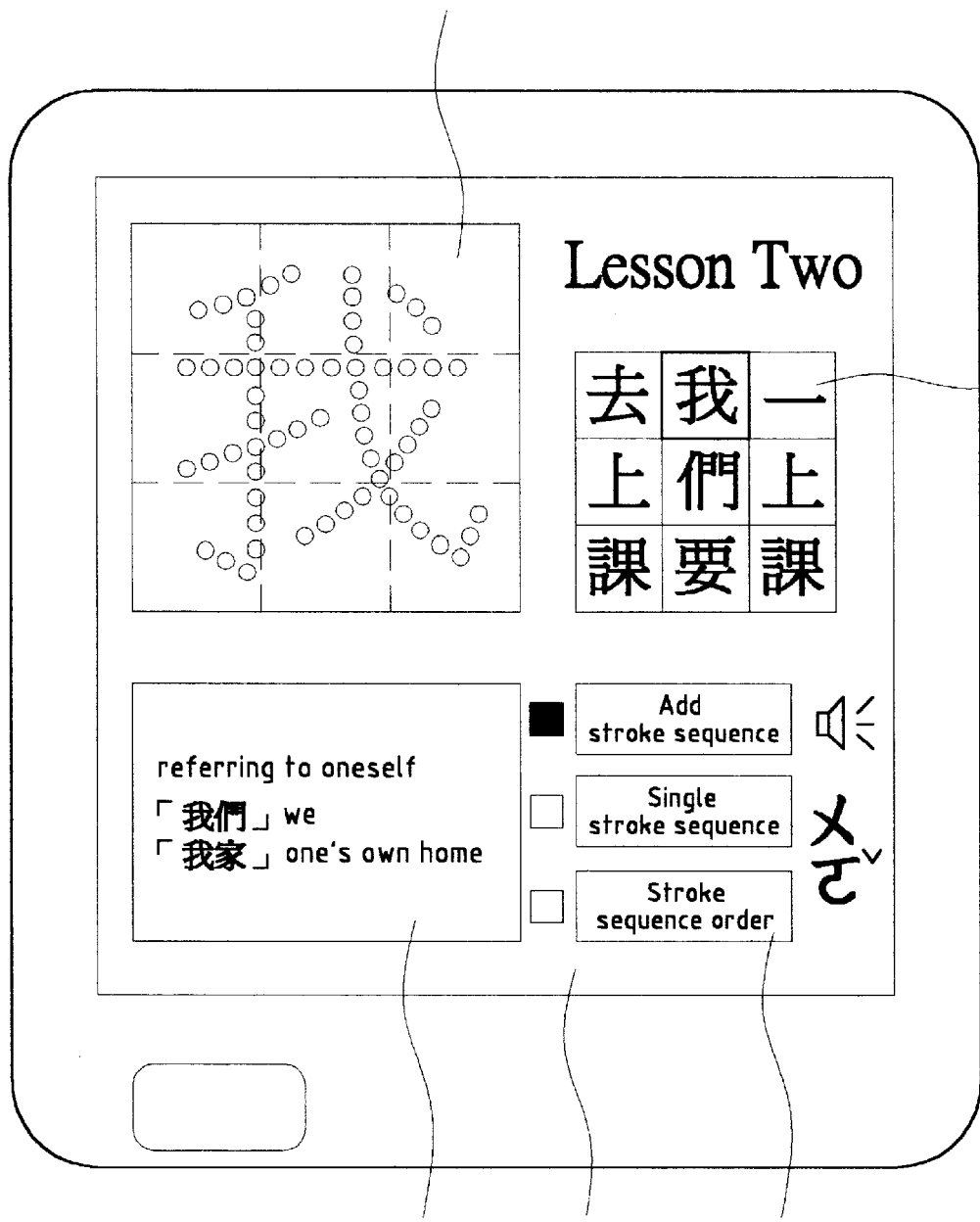
FIG. 2 is a plane view of the present invention.
Figure 3:
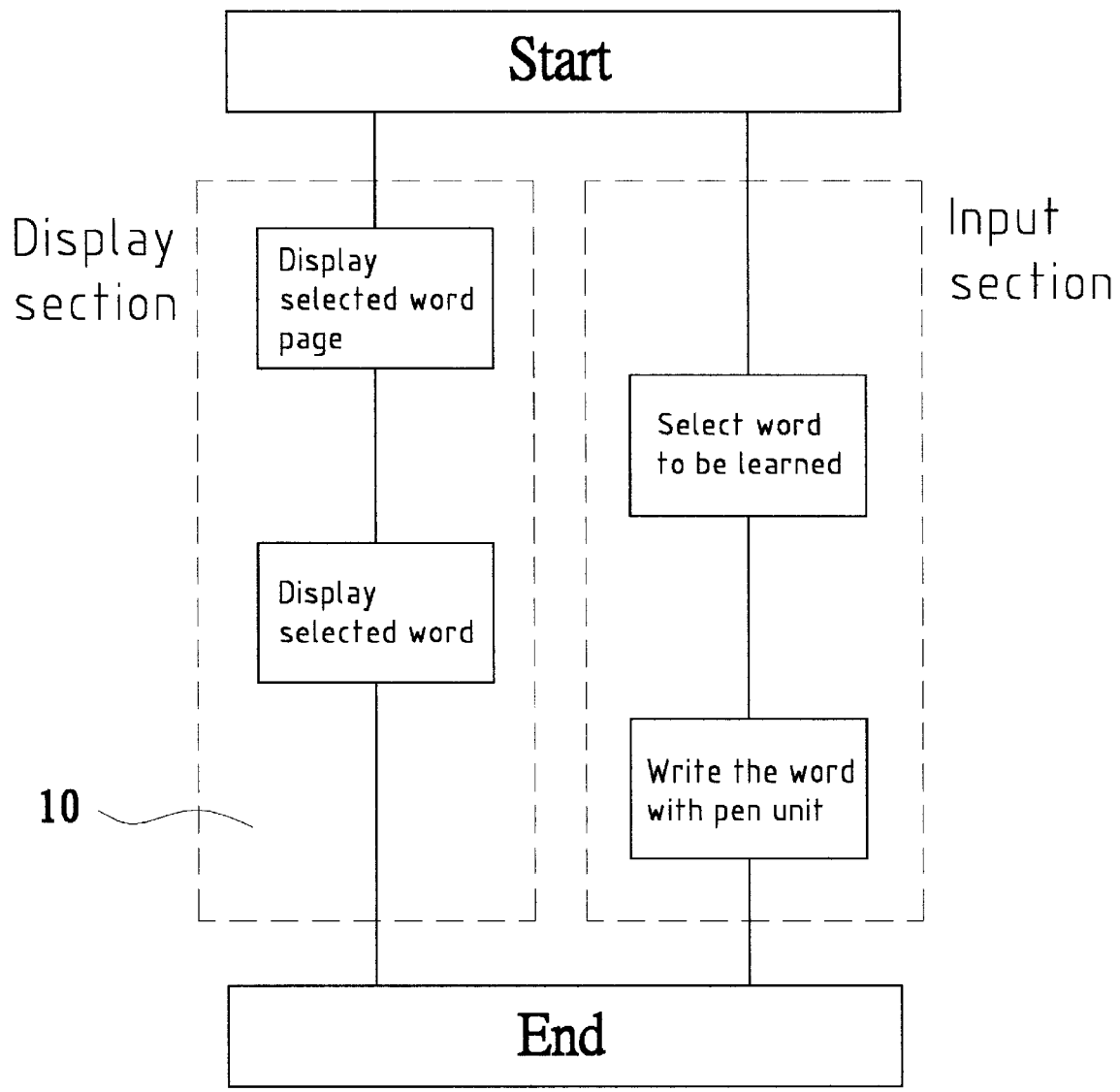
FIG. 3 is a block diagram of the present invention.
Figure 4:
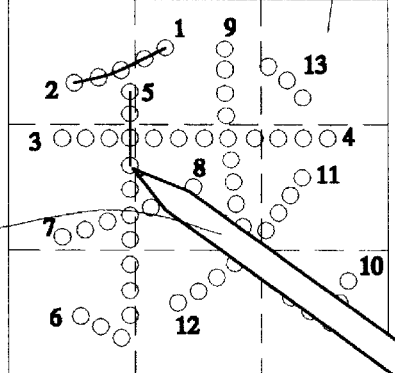
FIG. 4 is a plane view showing the use of the present invention.

FIG. 2 which shows the operation flow chart of the manuscript input data processing device of the present invention. First, a user can see from the display section 10 a word option search. Then, on the input section 11, the user can point select the option of the word selection unit 20 as desired. This option includes the subject (such as dining, shopping, etc.) of the word and the hardness grade (such as lesson one, etc.) after classified. After selected, the word selection unit 20 according to the point selected word option searches the data previously recorded in the memory 21. By means of the word display unit 232, the stroke sequence of the word is completely presented byway of the notation with special lines, etc. At this time, the user only needs to use the pen unit 12 to lightly touch and sequentially write on the input section 11 the word stroke sequence and corresponding position shown in the word display unit 232 by way of special notation. The display/control unit 22 will record the word track written by the pen unit 12 into the memory 21. At the same time, the data are output to the corresponding position in the word display unit 232. After the user completes the correct writing of the word stroke sequence, another word can be selected and automatically displayed. Alternatively, the same word can be used for further practice. Accordingly, the user himself/herself can learn writing.

In the learning mode, the manuscript input data processing device makes judge on the basis of the mode set by the user (number of times of practice, correctness ratio or other settings). Therefore, in case the set mode is not completed during writing, the user must re-write until the set mode is completed and then the practice of the next word can be made.

In addition, when the user via the input section 11 selects any pattern of word in the word selection unit 20, not only the word display unit 232 will present the stroke sequence of the selected word on the display section 10, but also the word message display unit 233 will automatically cooperatively show the correct Roman or Chinese spelling of the word and the meaning and example sentence of the word. Also, the user can point select the correct pronunciation or reading. Accordingly, during learning the writing, the user can also understand the profile, pronunciation and meaning of the word and deeply impressed. Therefore, the learning can be enhanced.

It should be noted that the manuscript input data processing device of the present invention is not only applicable to specific persons (such as children). The memory stores words of various kinds of languages so that anyone can use the manuscript input data processing device to easily learn writing of words.

The above embodiments are only used to illustrate the present invention, not intended to limit the scope thereof. Many modifications of the above embodiments can be made without departing from the spirit of the present invention.

What is claimed is:

1. Manuscript input data processing device comprising:

a display section for displaying word selection unit and word operation unit and displaying the cursor and tracking when a pen unit touches the input section;

an input section, when the pen unit touches the input section, the input section inputting the coordinate data of the pen unit to overlap the display section;

a pen unit for touching the input section and indicating the coordinate position;

a display/control unit for detecting the coordinate position of the pen unit when the pen unit touches the input section so as to execute the point selected option of the corresponding position of the display section or record the moving track of the pen unit in the word display unit in the memory and display the track on corresponding position of the word display unit;

a word selection unit on the display section for enabling a user to search the data in the memory according to the word option of different learning progresses;

a memory for recording the data of the written track of the pen unit and for recording various data of the word, whereby a user can according to different learning needs previously recorded in the word selection unit display on the display section the word stroke sequence with special notation; and a word operation unit enabling a user to according to different functions for learning needs display the word stroke sequence with special notation and write the relative position of the word stroke sequence with special notation and display relevant data of the word.

2. Manuscript input data processing device as claimed in claim 1, wherein the word operation unit includes a word option control unit, a word display unit and a word message display unit, the word option control unit enabling a user to decide whether a function should be closed according to different learning needs, the word display unit providing the words selected in the word selection unit and shows the word stroke sequence by way of the option and specific notation pattern decided in the word option control unit and also enabling a user to with the pen unit write the corresponding position of the word stroke with specific notation in the input section and show the writing track, the word message display unit enabling a user to display relevant data of the selected word.

3. Manuscript input data processing device as claimed in claim 1, wherein the word option of the word selection unit includes word subject, classified hardness grade and classification manners for facilitating learning and consulting words.

4. Manuscript input data processing device as claimed in claim 1, wherein the special notations include stroke position, sequence, etc. enabling a user to understand messages of stroke sequence of writing word including notations composed of various kinds of colors, line patterns and numerals.

5. Manuscript input data processing device as claimed in claim 1, wherein the memory includes fixed-type memory element able to or unable to renew data or mobile memory element with replaceable and changeable functions.

6. Manuscript input data processing device as claimed in claim 2, wherein the word message display unit is able to display the meaning, spelling including Roman spelling, Chinese spelling or other spellings, example sentence and previously recorded pronunciation of the word.

7. Manuscript input data processing device as claimed in claim 1, wherein the memory not only stores Chinese characters, but also stores words of various kinds of languages.

* * * * *